(12) United States Patent
Ramachandran et al.

(10) Patent No.: US 9,225,996 B2
(45) Date of Patent: Dec. 29, 2015

(54) MOTION REFINEMENT ENGINE WITH FLEXIBLE DIRECTION PROCESSING AND METHODS FOR USE THEREWITH

(75) Inventors: Avinash Ramachandran, Toronto (CA); Edward Hong, North York (CA); Gang Qiu, Richmond Hill (CA)

(73) Assignee: ViXS Systems, Inc., Toronto (CA)

( * ) Notice: Subject to any disclaimer, the term of this patent is extended or adjusted under 35 U.S.C. 154(b) by 2310 days.

(21) Appl. No.: 12/026,505

(22) Filed: Feb. 5, 2008

(65) Prior Publication Data
US 2009/0161761 A1 Jun. 25, 2009

(51) Int. Cl.
| | |
|---|---|
| H04N 7/12 | (2006.01) |
| H04N 19/577 | (2014.01) |
| H04N 19/105 | (2014.01) |
| H04N 19/52 | (2014.01) |
| H04N 19/176 | (2014.01) |
| H04N 19/51 | (2014.01) |
| H04N 19/149 | (2014.01) |
| H04N 19/115 | (2014.01) |
| H04N 19/61 | (2014.01) |
| H04N 19/112 | (2014.01) |
| H04N 19/124 | (2014.01) |
| H04N 19/533 | (2014.01) |
| H04N 19/523 | (2014.01) |

(52) U.S. Cl.
CPC ........... *H04N 19/577* (2014.11); *H04N 19/105* (2014.11); *H04N 19/112* (2014.11); *H04N 19/115* (2014.11); *H04N 19/124* (2014.11); *H04N 19/149* (2014.11); *H04N 19/176* (2014.11); *H04N 19/51* (2014.11); *H04N 19/52* (2014.11); *H04N 19/523* (2014.11); *H04N 19/533* (2014.11); *H04N 19/61* (2014.11)

(58) Field of Classification Search
None
See application file for complete search history.

(56) References Cited

U.S. PATENT DOCUMENTS

2006/0256866 A1* 11/2006 Ziauddin et al. ......... 375/240.15

\* cited by examiner

*Primary Examiner* — Faruk Hamza
*Assistant Examiner* — Thinh Tran
(74) *Attorney, Agent, or Firm* — Garlick & Markison; Bruce E. Struckman

(57) ABSTRACT

A motion refinement engine can be used in a video encoder for encoding a video input signal that includes a sequence of images that are segmented into a plurality of macroblocks. The motion refinement engine includes a motion search module, that generates at least one motion search motion vector for a macroblock of the plurality of macroblocks based on a first plurality of directions. A motion refinement module generates at least one refined motion vector for the macroblock of the plurality of macroblocks, based on a second plurality of directions, wherein the second plurality of directions differ from the first plurality of directions. In a further embodiment, motion search, motion refinement, and motion compensation are selectively performed in a single pass.

18 Claims, 11 Drawing Sheets

US 9,225,996 B2

MOTION REFINEMENT ENGINE WITH FLEXIBLE DIRECTION PROCESSING AND METHODS FOR USE THEREWITH

CROSS REFERENCE TO RELATED PATENTS

The present application claims priority under 35 USC 119 to the provisionally filed application entitled, "MOTION REFINEMENT ENGINE WITH FLEXIBLE DIRECTION PROCESSING AND METHODS FOR USE THEREWITH, having Ser. No. 61/014,928, filed on Dec. 19, 2007, expired.

TECHNICAL FIELD OF THE INVENTION

The present invention relates to encoding used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
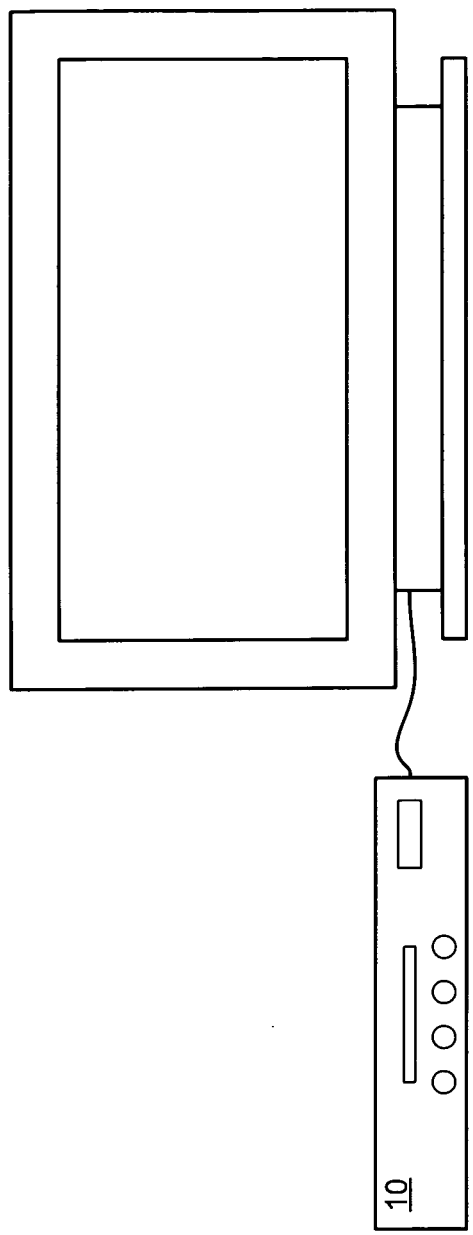
FIGS. 1-3 present pictorial diagram representations of various video processing devices in accordance with embodiments of the present invention.
Figure 3:
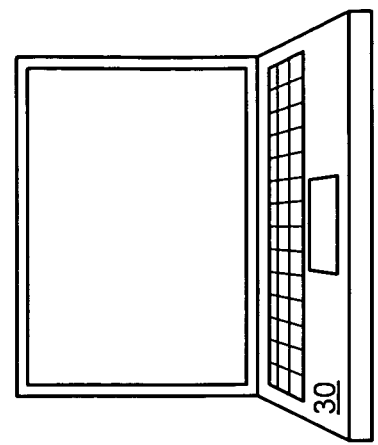
Figure 2:
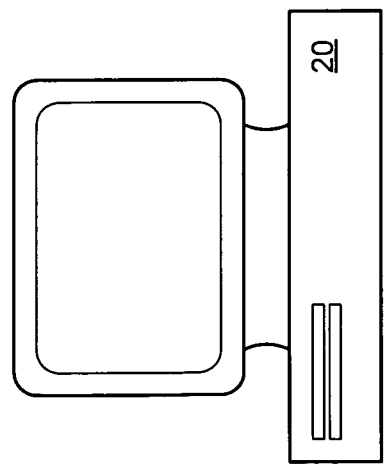

FIGS. 1-3 present pictorial diagram representations of various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding video content in accordance with the methods and systems described in conjunction with FIGS. 4-13 and the appended claims.

Figure 4:
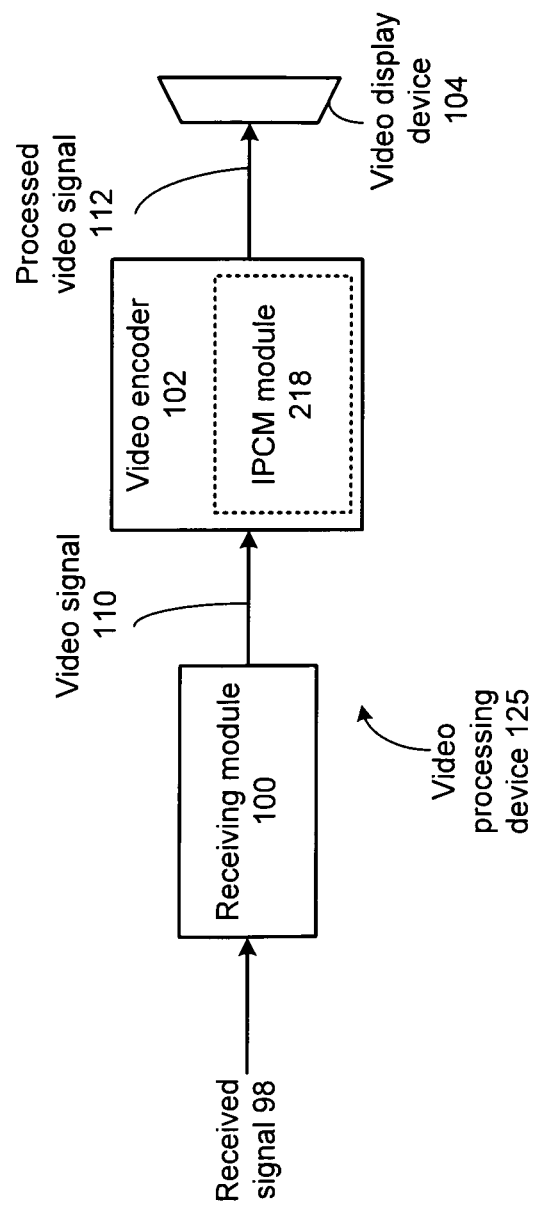
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoder 102 is coupled to the receiving module 100 to encode or transcode the video signal in a format corresponding to video display device 104.

In an embodiment of the present invention, the received signal 98 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a codec standard such as H.264, MPEG-4 Part 10 Advanced Video Coding (AVC) or another digital format such as a Motion Picture Experts Group (MPEG) format (such as MPEG1, MPEG2 or MPEG4), Quicktime format, Real Media format, Windows Media Video (WMV), Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder 102 includes a motion refinement engine with flexible direction processing. Motion vectors for each macroblock can be calculated in a forward direction referenced to a past picture, in a backward direction referenced to a future picture or in a blended direction, based on blending of forward and backward directions. In accordance with the present invention, each direction can be processed based on a selectable subset of the possible partitionings of each macroblock. In this fashion, different partitionings can optionally be evaluated for each direction. The motion vectors corresponding to each subblock can be chosen based on different directions. Further, different modules, such as motion search and motion refinement modules can operate based on different subsets of the possible directions. In addition, motion search, motion refinement and the remaining steps of motion compensation can selectively be performed in a single pass for all directions or in separate passes for each direction. Video encoder 102 includes many optional functions and features described in conjunction with FIGS. 5-13 that follow.

Figure 5:
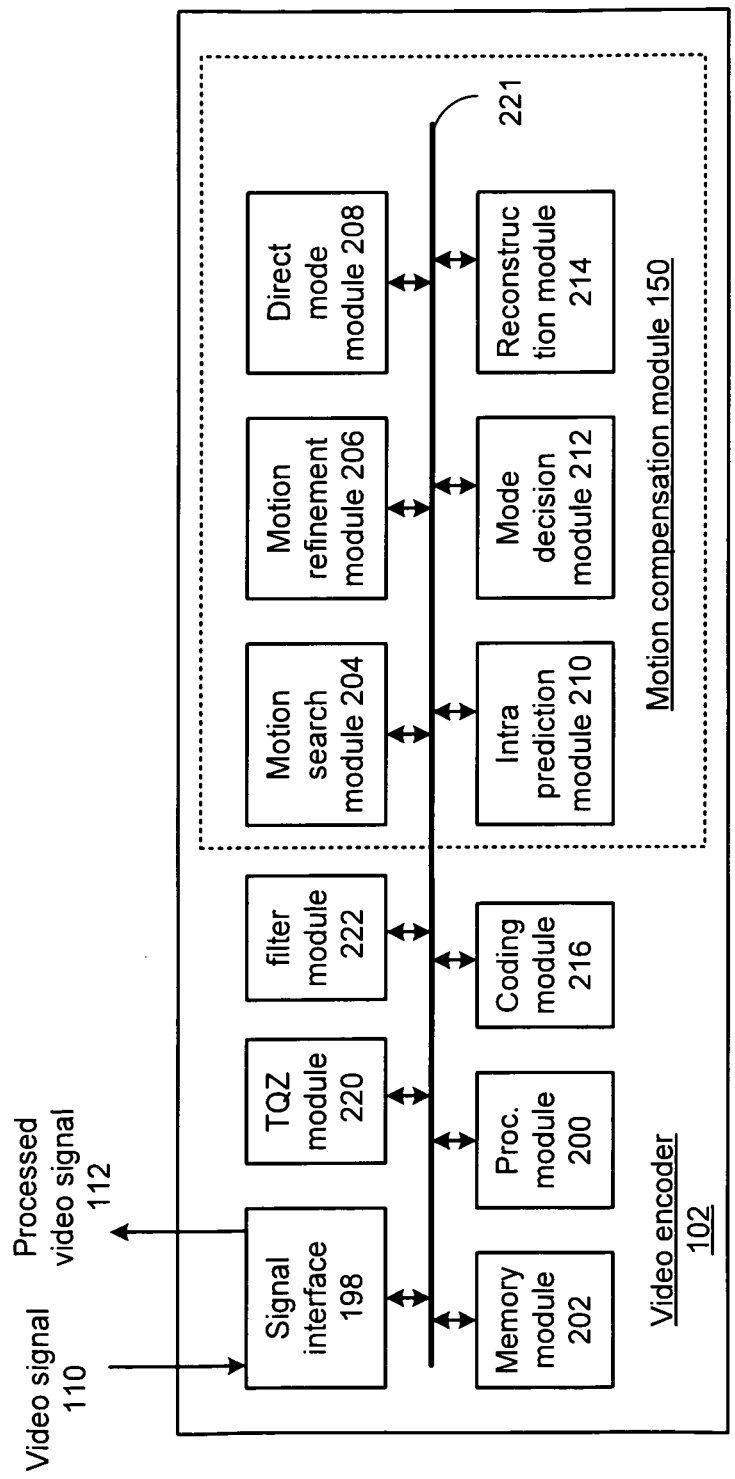
FIG. 5 presents a block diagram representation of a video encoder 102 that includes motion search module 204, motion refinement module 206 and mode decision module 212 in accordance with an embodiment of the present invention.

FIG. 5 presents a block diagram representation of a video encoder 102 having a motion compensation module 150 that includes motion search module 204, motion refinement module 206 and an intra pulse code modulation (IPCM) module 218 in accordance with an embodiment of the present invention. In particular, video encoder 102 operates in accordance with many of the functions and features of the H.264 standard, the MPEG-4 standard, VC-1 (SMPTE standard 421M) or other standard, to encode a video input signal 110 that is converted to a digital format via a signal interface 198.

The video encoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, coding module 216, transform and quantization module 220 and filter module 222. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks as described further in conjunction with FIG. 8) that represents the displacement of the macroblock (or subblock) from a reference frame or reference field of the video signal to a current frame or field. When processing in a forward direction, the reference frame or field may be a past picture such as the previous frame or field. When processing in a backward direction, the reference frame or field may be a future picture such as the next frame or field.

In an embodiment of the present invention, motion search module 204 uses only a subset of the possible directions, such as only forward and backward directions in determining motion search motion vectors for each subblock of the macroblock. It should also be noted that motion search module 204 can determine motion search motion vectors for different subblocks of a macroblock in different directions. For instance, a motion vector from one subblock of a macroblock may be referenced in the forward direction to the previous picture while another subblock of that macroblock may be referenced in the backward direction to a future picture.

In operation, the motion search module operates within a search range to locate a macroblock (or subblock) in the current frame or field to an integer pixel level accuracy such as to a resolution of 1-pixel. Candidate locations are evaluated based on a motion search cost formulation to determine the location and corresponding motion vector that have a most favorable (such as lowest) cost.

In an embodiment of the present invention, a cost formulation such as a sum of absolute differences (SAD), sum of absolute transformed differences (SATD) or other cost is determined based on the reference macroblock and candidate macroblock pixel values and optionally a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. For instance, the cost calculation can avoid the use of neighboring subblocks within the current macroblock. In this fashion, motion search module 204 is able to operate on a macroblock to contemporaneously determine the motion search motion vector for each subblock of the macroblock.

A motion refinement module 206, when enabled, generates a refined motion vector for each macroblock of the plurality of macroblocks, based on the motion search motion vector. In an embodiment of the present invention, the motion refinement module determines, for each macroblock or macroblock pair of a field and/or frame of the video input signal 110, a refined motion vector that represents the displacement of the macroblock from a reference frame or reference field of the video signal to a current frame or field. In operation, the motion refinement module refines the location of the macroblock in the current frame or field to a greater pixel level accuracy such as to a resolution of ¼-pixel. Candidate locations are also evaluated based on a cost formulation to determine the location and refined motion vector that have a most favorable (such as lowest) cost.

Like the motion search module 204, the motion refinement module 206 can operate on a subset of the possible directions. When processing in a forward direction, the reference frame or field may be a past picture such as the previous frame or field. When processing in a backward direction, the reference frame or field may be a future picture such as the next frame or field. In addition, a blended direction may optionally be used.

In an embodiment of the present invention, motion refinement module 206 operates using a different subset of the possible directions than is used by the motion search module 204. In particular, motion refinement module 206 evaluates forward, backward and blended directions in determining refined motion vectors for each subblock of the macroblock. It should also be noted that motion refinement module 206 can determine refined motion vectors for different subblocks of a macroblock in different directions. For instance, a motion vector from one subblock of a macroblock may be referenced in the forward direction to the previous picture, while another subblock of that macroblock may be referenced in the backward direction to a future picture, and while another subblock of that macroblock may be referenced in a blended direction to both a past and future picture.

When blended directions are used in either motion search module 204 or motion refinement module 206, motion vectors and/or associated costs associated with forward and backward directions can be stored in a buffer, cache or other memory structure and can be retrieved when processing the blended direction. In this fashion, calculations used in processing motion vectors and/or costs on the forward and backward need not be repeated when blended direction processing is performed.

As in the case with the motion search module, a SAD or SATD cost formulation or other cost formulation and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. Optionally, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video input signal 110, to contemporaneously determine the refined motion vector for each macroblock in the row.

A direct mode module 208 generates a direct mode motion vector for each macroblock based on macroblocks that neighbor the macroblock for which a motion vector is being evaluated. In an embodiment of the present invention, the direct mode module 208 operates to determine the direct mode motion vector and the cost associated with the direct mode motion vector based on the cost for candidate direct mode motion vectors for the B slices of video input signal 110, such as in a fashion defined by the H.264 standard.

While the prior modules have focused on inter-prediction of the motion vector based on the current frame or field and one or more reference frames or fields, intra-prediction module 210 generates a best intra prediction mode for each macroblock. In an embodiment of the present invention, intra-prediction module 210 operates as defined by the H.264 standard, however, other intra-prediction techniques can likewise be employed. In particular, intra-prediction module 210 operates to evaluate a plurality of intra prediction modes such as a Intra-4×4 or Intra-16×16, which are luma prediction modes, chroma prediction (8×8) or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra-prediction mode, and in particular, the method that yields the most favorable (lowest) cost, or an otherwise acceptable cost. Reconstruction module 214 completes motion compensation by generating residual chroma and luma pixel values for each macroblock of the plurality of macroblocks by subtraction from the pixel values of the current frame/field. Reconstruction module 214 further generates unfiltered reconstructed frames/fields by re-adding residual pixel values (processed through transform and quantization module 220).

In an embodiment of the present invention, the motion search module 204, motion refinement module 206, mode decision module 212 and reconstruction module 214 can selectively operate, in response to a directional processing flag being set, to determine residual chroma and luma values for all directions in a single pass. This option can be effective for certain encoding techniques such as VC1 or AVC, encoding where the same subsets of possible partitionings are evaluated for each direction or in other circumstances when one-pass processing can be efficiently implemented. Further, the directional processing flag can be set to another value that corresponds with processing one direction at a time. In this alternative mode, the motion search module 204, motion refinement module 206, mode decision module 212 and reconstruction module 214 can selectively operate, in response to a directional processing flag being reset, to determine residual chroma and luma values with separate passes for each direction. This multi-pass mode can be efficient in circumstances where different subsets of possible partitionings (and possibly non-intersecting subsets) are selected for each direction.

The transform and quantization module 220 transforms and quantizes the residual pixel values that can be further coded, such as by entropy coding in coding module 216 and reordered and output as processed video signal 112 via signal interface 112 in a format to be transmitted, stored, etc. In addition, transform and quantization module 220 re-forms residual pixel values by inverse transforming and dequantization that can be further processed by reconstruction module 214 to form unfiltered reconstructed frames/fields as discussed above.

Deblocking filter module 222 forms the current reconstructed frames/fields from the unfiltered reconstructed frames/fields. While a deblocking filter is shown, other filter configurations can likewise be used within the broad scope of the present invention. It should also be noted that current reconstructed frames/fields can be buffered to generate reference frames/fields for future current frames/fields. While not expressly shown, video encoder 102 can include a memory cache, a memory management module, a comb filter or other video filter, and/or other module to support the encoding of video input signal 110 into processed video signal 112.

Figure 6:
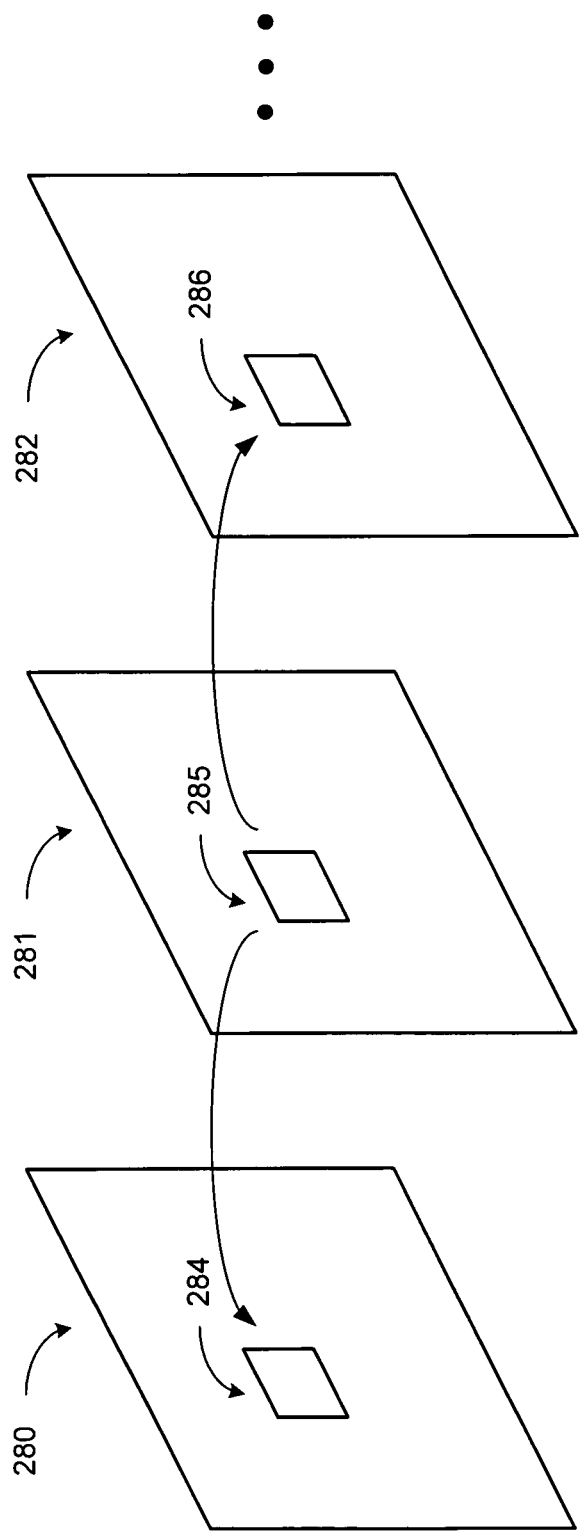
FIG. 6 presents a graphical representation of the relationship between a macroblock of a current picture and a the corresponding macroblock in a past or future picture in accordance with an embodiment of the present invention.

FIG. 6 presents a graphical representation of the relationship between a macroblock of a current picture and the corresponding macroblock in a past or future picture in accordance with an embodiment of the present invention. In particular, pictures 280, 281 and 282 represent pictures, such as frames or fields of a video signal such as video signal 110, containing macroblocks 284, 285 and 286, respectively. In this diagram, time moves from left to right. Considering picture 281 to be the "current", picture 280 is a past picture and picture 282 is a future picture. As discussed in conjunction with FIG. 5, different partitionings of macroblock 285 into subblocks can be evaluated based on whether a forward, backward or blended processing is used. A particular subblock of 285 is compared in a forward direction to subblocks of picture 280, in a reverse direction to subblocks of picture 282, or subblocks blended from pictures 280 and 282.

Figure 7:
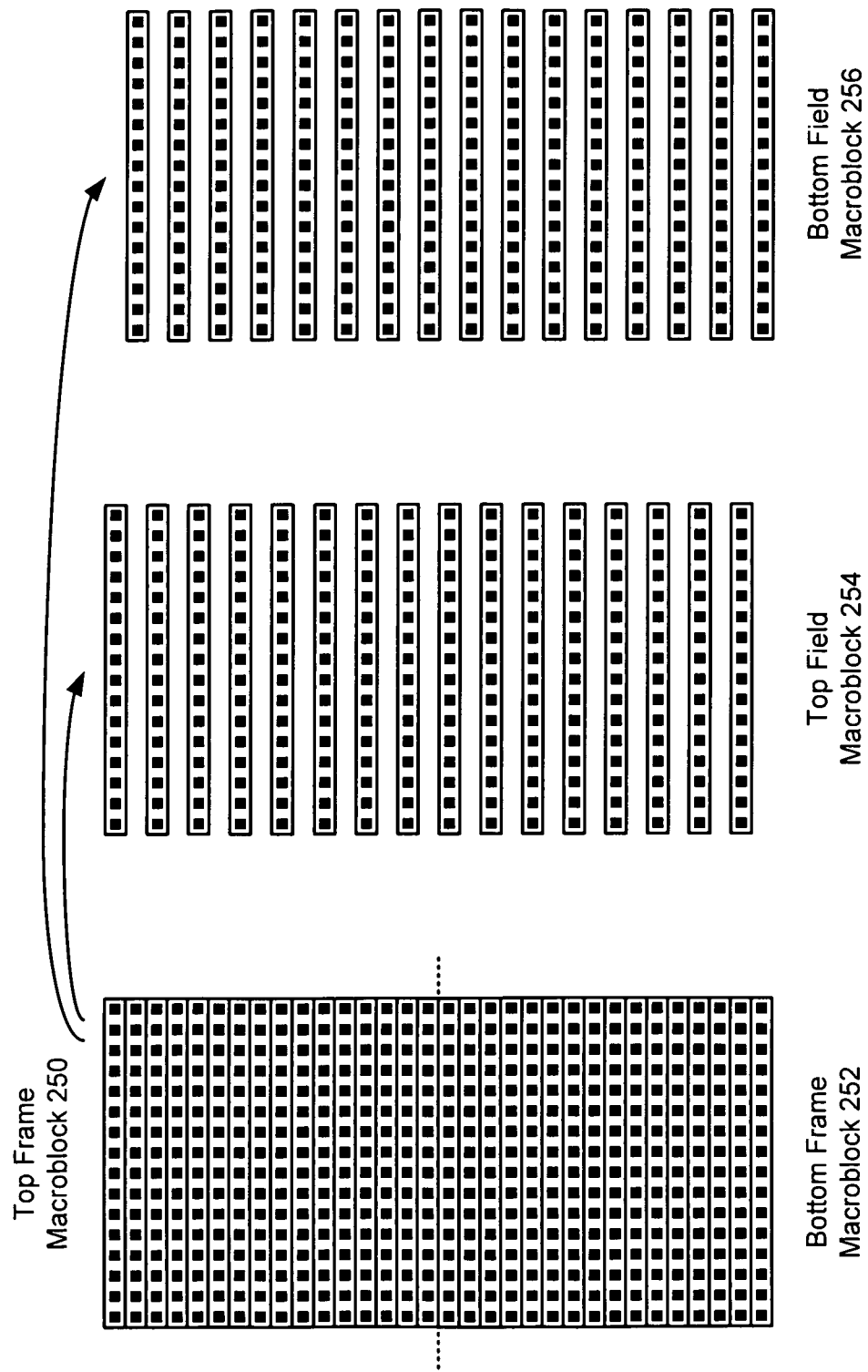
FIG. 7 presents a graphical representation of the relationship between example top frame and bottom frame macroblocks (250, 252) and example top field and bottom field macroblocks (254, 256) in accordance with an embodiment of the present invention.

FIG. 7 presents a graphical representation of the relationship between exemplary top frame and bottom frame macroblocks (250, 252) and exemplary top field and bottom field macroblocks (254, 256). Motion search module 204 generates a motion search motion vector for each macroblock by contemporaneously evaluating a macroblock pair that includes a top frame macroblock 250 and bottom frame macroblock 252 from a frame of the video input signal 110 and a top field macroblock 254 and a bottom field macroblock 256 from corresponding fields of the video input signal 110.

Considering the example shown, each of the macroblocks are 16 pixels by 16 pixels in size. Motion search is performed in full pixel resolution, or other resolution, either coarser or finer, by comparing a candidate frame macroblock pair of a current frame that includes top frame macroblock 250 and bottom frame macroblock 252 to the macroblock pair of a reference frame. In addition, lines of a first parity (such as odd lines) from the candidate frame macroblock pair are grouped to form top field macroblock 254. Similarly, lines of a second parity (such as even lines) from the candidate frame macroblock pair are grouped to form bottom field macroblock 256. Motion search module 204 calculates a cost associated with a plurality of lines by:

(a) generating a cost associated with the top frame macroblock 250 based on a cost accumulated for a plurality of top lines of the plurality of lines, (b) generating a cost associated with the bottom frame macroblock 252 based on a cost accumulated for a plurality of bottom lines of the plurality of lines, (c) generating a cost associated with the top field macroblock 254 based on a cost accumulated for a plurality of first-parity lines of the plurality of lines compared with either a top or bottom field reference, and (d) generating a cost associated with the bottom field macroblock 256 based on a cost accumulated for a plurality of second-parity lines of the plurality of lines, also based on either a top or bottom field reference. In this fashion, six costs can be generated contemporaneously for the macroblock pair: top frame compared with top frame of the reference; bottom frame compared with the bottom frame of the reference; top field compared with top field of the reference; bottom field compared with the bottom field of the reference; top field compared with bottom field of the reference; and bottom field compared with the top field of the reference.

For example, each of these costs can be generated based on the sum of the absolute differences (SAD) of the pixel values of the current frame or field with the reference frame or field. The SADs can be calculated contemporaneously, in a single pass, based on the accumulation for each line. The overall SAD for a particular macroblock (top or bottom, frame or field) can be determined by totaling the SADs for the lines that make up that particular macroblock. Alternatively, the SADs can be calculated in a single pass, based on the smaller segments such as 4×1 segments that can be accumulated into subblocks, that in turn can be accumulated into overall macroblock totals. This alternative arrangement particularly lends itself to motion search modules that operate based on the partitioning of macroblocks into smaller subblocks, as will be discussed further in conjunction with FIG. 8.

The motion search module 204 is particularly well adapted to operation in conjunction with macroblock adaptive frame and field processing. Frame mode costs for the current macroblock pair can be generated as discussed above. In addition, motion search module 204 optionally generates a field decision based on accumulated differences, such as SAD, between the current bottom field macroblock and a bottom field macroblock reference, the current bottom field macroblock and a top field macroblock reference, the current top field macroblock and the bottom field macroblock reference, and the current top field macroblock and the top field macroblock reference. The field decision includes determining which combination (top/top, bottom/bottom) or (top/bottom, bottom/top) yields a lower cost. Similarly, motion search module 204 can optionally choose either frame mode or field mode for a particular macroblock pair, based on whether the frame mode cost compares more favorably (e.g. are lower) or less favorably (e.g. higher) to the field mode cost, based on the field mode decision. In addition, other modes of motion compensation module 150 operating on both frames and field can be used.

Figure 8:
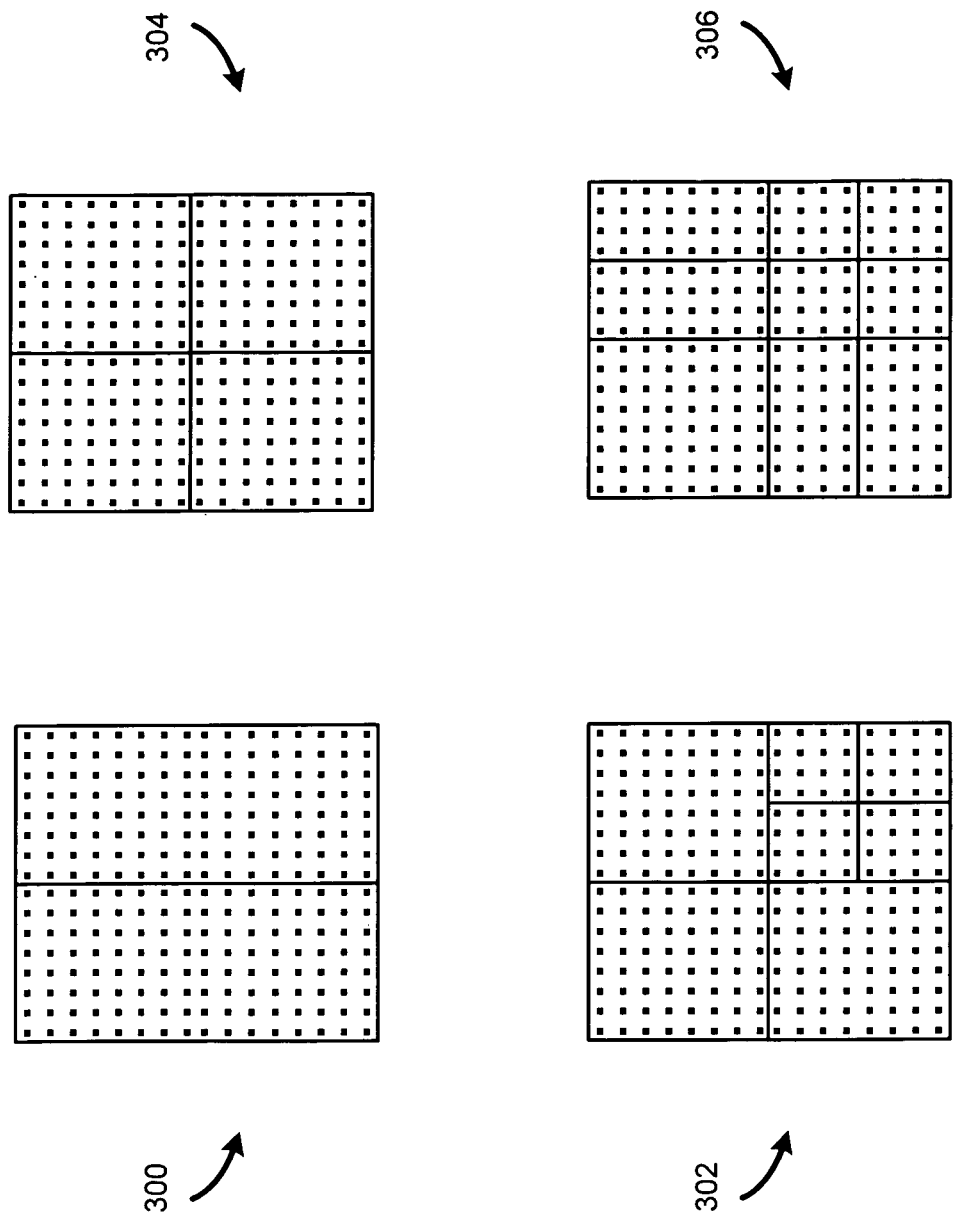
FIG. 8 presents a graphical representation that shows example macroblock partitioning in accordance with an embodiment of the present invention.

FIG. 8 presents a graphical representation of exemplary partitionings of a macroblock of a video input signal into subblocks. While the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side. The subblocks can be dealt with in the same way as macroblocks. For example, motion search module 204 can generate separate motion search motion vectors for each subblock of each macroblock, etc.

Macroblock 300, 302, 304 and 306 represent examples of partitioning into subblocks in accordance with the H.264 standard. Macroblock 300 is a 16×16 macroblock that is partitioned into two 8×16 subblocks. Macroblock 302 is a 16×16 macroblock that is partitioned into three 8×8 subblocks and four 4×4 subblocks. Macroblock 304 is a 16×16 macroblock that is partitioned into four 8×8 subblocks. Macroblock 306 is a 16×16 macroblock that is partitioned into an 8×8 subblock, two 4×8 subblocks, two 8×4 subblocks, and four 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of partitions of a particular macroblock. The result however can yield more accurate motion compensation and reduced compression artifacts in the decoded video image.

As discussed in conjunction with FIG. 5, the motion search motion vector of refined motion vector for different subblocks of a macroblock can be referenced to different directions. Considering, for example, the partitioning shown in conjunction with macroblock 302, the refined motion vector for the top-right and bottom left 8×8 subblocks could be in a backward direction, the refined motion vector for the top left 8×8 subblock could be in a blended direction, the top two 4×4 subblocks could be in a forward direction, and the bottom two 4×4 subblocks could be in a backward direction.

Figure 9:
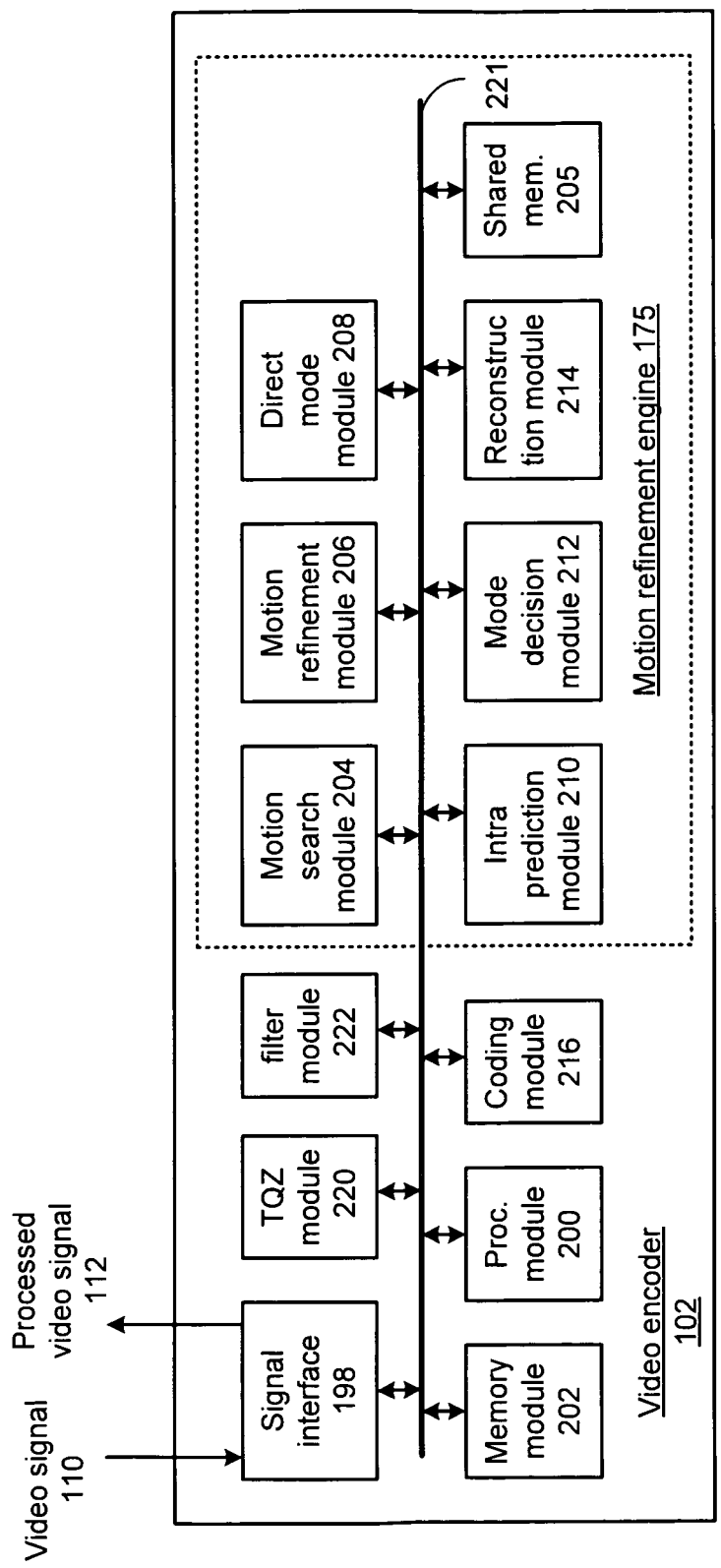
FIG. 9 presents a block diagram representation of a video encoder 102 that includes motion refinement engine 175 in accordance with an embodiment of the present invention.

FIG. 9 presents a block diagram representation of a video encoder 102 that includes a motion refinement engine 175 in accordance with an embodiment of the present invention. In addition to modules referred to by common reference numerals used to refer to corresponding modules of previously described embodiments, motion refinement engine 175 includes a shared memory 205 that can be implemented separately from, or as part of, memory module 202. In addition, motion refinement engine 175 can be implemented in a special purpose hardware configuration that has a generic design capable of handling a sub-pixel search using different reference pictures—either frame or field and either forward in time, backward in time or a blend between forward and backward. Motion refinement engine 175 can operate in a plurality of compression modes to support a plurality of different compression algorithms such as H.264, MPEG-4, VC-1, etc., in an optimized and single framework. Reconstruction can be performed for chroma only, luma only or both chroma and luma.

For example, the capabilities these compression modes can include:

H.264:
1. Motion search and refinement on all large partitions into subblocks of size (16×16), (16×8), (8×16) and (8×8) for forward/backward and blended directions when MBAFF is ON. This also includes field and frame MB types.
2. Motion search and refinement on all partitions into subblocks of size (16×16), (16×8), (8×16) and (8×8), and subpartitions into subblocks of size (8×8), (8×4), (4×8), and (4×4) for forward/backward and blended directions when MBAFF is OFF.
3. Computation of direct mode and/or skip mode cost for MBAFF ON and OFF.
4. Mode decision is based on all the above partitions for MBAFF ON and OFF. The chroma reconstruction for the corresponding partitions is implicitly performed when the luma motion reconstruction is invoked.
5. Motion refinement and compensation include quarter pixel accurate final motion vectors using the 6 tap filter algorithms of the H.264 standard.

VC-1:
1. Motion search and refinement for both 16×16 and 8×8 partitions for both field and frame cases for forward, backward and blended directions.
2. Mode decision is based on each of the partitions above. This involves the luma and corresponding chroma reconstruction.
3. Motion refinement and compensation include bilinear half pixel accurate final motion vectors of the VC-1 standard.

MPEG-4:
1. Motion search and refinement for both 16×16 and 8×8 partitions for both field and frame cases for forward, backward and blended directions.
2. Mode decision is based on all of the partitions above. Reconstruction involves the luma only.
3. Motion refinement and compensation include bilinear half pixel accurate MVs of the VC-1 standard.

Further, motion refinement engine 175 can operate in two basic modes of operation: (1) where the operations of motion refinement module 206 are triggered by and/or directed by software/firmware algorithms included in memory module 202 and executed by processing module 200; and (2) where operations of motion refinement module 206 are triggered by the motion search module 204, with little or no software/firmware intervention. The first mode operates in accordance with one or more standards, possibly modified as described herein. The second mode of operation can be dynamically controlled and executed more quickly, in an automated fashion and without a loss of quality.

Shared memory 205 can be individually, independently and contemporaneously accessed by two more modules of motion refinement engine 175 such as motion search module 204, motion refinement module 206, and particularly IPCM module 218 to facilitate either the first or second mode of operation. In particular, shared memory 205 includes a portion of memory, such as a cost table that stores results (such as motion vectors and costs) that result from the computations performed by motion search module 204. This cost table can include a plurality of fixed locations in shared memory where these computations are stored for later retrieval by motion refinement module 206 or IPCM module 218, particularly for use in the second mode of operation. In addition, to the cost table, the shared memory 205 can also store additional information, such as a hint table, that tells the motion refinement module 206 and the firmware of the decisions it makes for use in either mode, again based on the computations performed by motion search module 204. Examples include: identifying which partitions are good, others that are not as good and/or can be discarded; identifying either frame mode or field mode as being better and by how much; and identifying which direction, amongst forward, backward and blended is good and by how much, etc.

The motion search module may terminate its computations early based on the results it obtains. In any case, motion search can trigger the beginning of motion refinement directly by a trigger signal sent from the motion search module 204 to the motion refinement module 206. Motion refinement module 206 can, based on the data stored in the hint table and/or the cost table, have the option to refine only particular partitions, a particular mode (frame or field), and/or a particular direction (forward, backward or blended) that either the motion search module 204 or the motion refinement module 206 determines to be good based on a cost threshold or other performance criteria. In the alternative, the motion refinement module can proceed directly based on software/firmware algorithms in a more uniform approach. In this fashion, motion refinement engine 175 can dynamically and selectively operate so as to complete the motion search and motion refinement, pipelined and in parallel, such that the refinement is performed for selected partitions, all the subblocks for a single partition, group of partitions or an entire macroblock (MB)/MB pair on both a frame and field basis, on only frame or field mode basis, and for forward, backward and blended directions of for only a particular direction, or skip further motion compensation altogether, either because the results obtained are so good as to make further motion compensation unnecessary.

In an embodiment of the present invention, the motion search module 204, motion refinement module 206, mode decision module 212 and reconstruction module 214 can selectively operate, in response to a directional processing flag being set, to determine residual chroma and luma values for all directions in a single pass. This option can be effective for certain encoding techniques such as VC1 or AVC, encoding where the same subsets of possible partitionings are evaluated for each direction or in other circumstances when one-pass processing can be efficiently implemented. Further, the directional processing flag can be set to another value that corresponds with processing one direction at a time. In this alternative mode, the motion search module 204, motion refinement module 206, mode decision module 212 and reconstruction module 214 can selectively operate, in response to a directional processing flag being reset, to determine residual chroma and luma values with separate passes for each direction. This multi-pass mode can be efficient in circumstances where different subsets of possible partitionings (and possibly non-intersecting subsets) are selected for each direction.

As discussed in conjunction with FIG. 5, motion search module 204 and motion refinement module 206 can selectively operate on a subset (including a full set) of the possible directions. The motion refinement module 206 can operates using the same or a different subset of the possible directions than is used by the motion search module 204. The motion search module 204 and motion refinement module 206 can determine refined motion vectors for different subblocks of a macroblock in different directions. For instance, a motion vector from one subblock of a macroblock may be referenced in the forward direction to the previous picture, while another subblock of that macroblock may be referenced in the backward direction to a future picture, and while another subblock of that macroblock may be referenced in a blended direction to both a past and future picture.

When blended directions are used in either motion search module 204 or motion refinement module 206, motion vectors and/or associated costs associated with forward and backward directions can be stored in the shared memory 205 and can be retrieved when processing the blended direction. In this fashion, calculations used in processing motion vectors and/or costs on the forward and backward need not be repeated when blended direction processing is performed.

In operation, motion search module 204 contemporaneously generates a motion search motion vector for a plurality of subblocks for a plurality of partitionings of a macroblock of a plurality of MB/MB pairs. Motion refinement module 206, when enabled, contemporaneously generates a refined motion vector for the plurality of subblocks for the plurality of partitionings of the MB/MB pairs of the plurality of macroblocks, based on the motion search motion vector for each of the plurality of subblocks of the macroblock of the plurality of macroblocks. As discussed in conjunction with FIG. 5, the motion search module 204 and motion refinement module 206 can selectively evaluate different subsets of the possible partitionings of the macroblock, based on whether they are processing in the forward, backward or blended direction.

Mode decision module selects a selected partitioning of the plurality of partitionings, based on costs associated with the refined motion vector for each of the plurality of subblocks of the plurality of partitionings, of the macroblock of the plurality of macroblocks, and determines a final motion vector for each of the plurality of subblocks corresponding to the selected partitioning of the macroblock of the plurality of macroblocks. Reconstruction module 214 generates residual pixel values, for chroma and/or luma, for the plurality of subblocks of the macroblock of the plurality of macroblocks.

Further, the motion search module 204 and the motion refinement module 206 can operate in a plurality of other selected modes including modes corresponding to any of several compression standards, and wherein the plurality of partitionings can be based on the selected mode. For instance, in one mode, the motion search module 204 and the motion refinement module 206 are capable of operating with macroblock adaptive frame and field (MBAFF) enabled when a MBAFF signal is asserted and with MBAFF disabled when the MBAFF enable signal is deasserted, and wherein the plurality of partitionings are based on the MBAFF enable signal. In an embodiment, when the MBAFF signal is asserted, the plurality of partitionings of the macroblock partition the macroblock into subblocks having a first minimum dimension of sizes 16 pixels by 16 pixels, 16 pixels by 8 pixels, 8 pixels by 16 pixels, and 8 pixels by 8 pixels—having a minimum dimension of 8 pixels. Further, when the MBAFF signal is deasserted, the plurality of partitionings of the macroblock partition the macroblock into subblocks having a second minimum dimension of sizes 16 pixels by 16 pixels, 16 pixels by 8 pixels, 8 pixels by 16 pixels, 8 pixels by 8 pixels, 4 pixels by 8 pixels, 8 pixels by 4 pixels, and 4 pixels by 4 pixels—having a minimum dimension of 4 pixels. In other modes of operation, the plurality of partitionings of the macroblock partition the macroblock into subblocks of sizes 16 pixels by 16 pixels, and 8 pixels by 8 pixels. While particular macroblock dimensions are described above, other dimensions are likewise possible within the scope of the present invention.

In addition to the partitionings of the MB/MB pairs being based on the particular compression standard employed, motion search module 204 can generate a motion search motion vector for a plurality of subblocks for a plurality of partitionings of a macroblock of a plurality of macroblocks and generate a selected group of the plurality of partitionings based on a group selection signal. Further, motion refinement module 206 can generate the refined motion vector for the plurality of subblocks for the selected group of the plurality of partitionings of the macroblock of the plurality of macroblocks, based on the motion search motion vector for each of the plurality of subblocks of the macroblock of the plurality of macroblocks. In this embodiment, the group selection signal can be used by the motion search module 204 to selectively apply one or more thresholds to narrow down the number of partitions considered by motion refinement module 206 in order to speed up the algorithm.

For example, when the group selection signal has a first value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks with a first threshold, and assigning the selected group to be a partitioning with the accumulated cost that compares favorably to the first threshold. In this mode, if a particular partitioning is found that generates a very good cost, the motion search module 204 can terminate early for the particular macroblock and motion refinement module 206 can operate, not on the entire set of partitionings, but on the particular partitioning that generates a cost that compares favorably to the first threshold.

Further, when the group selection signal has a second value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks and assigning the selected group to be the selected partitioning with the most favorable accumulated cost. Again, motion refinement module 206 can operate, not on the entire set of partitionings, but on the particular partitioning that generates the most favorable cost from the motion search.

In addition, when the group selection signal has a third value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks with a second threshold, and assigning the selected group to be each of partitionings of the plurality of partitionings with accumulated cost that compares favorably to the second threshold. In this mode, motion refinement module 206 can operate, not on the entire set of partitionings, but only on those partitionings that generate a cost that compares favorably to the second threshold.

As discussed above, the motion search module 204 and motion refinement module 206 can be pipelined and operate to contemporaneously generate the motion search motion vector for the plurality of subblocks for a plurality of partitionings of a macroblock of a plurality of macroblocks, in parallel. In addition, shared memory 205 can be closely coupled to both motion search module 204 and motion refinement module 206 to efficiently store the results for selected group of partitionings from the motion search module 204 for use by the motion refinement module 206. In particular, motion search module 204 stores the selected group of partitionings and the corresponding motion search motion vectors in the shared memory and other results in the cost and hint tables. Motion refinement module 206 retrieves the selected group of partitionings and the corresponding motion search motion vectors from the shared memory. In a particular embodiment, the motion search module 204 can generate a trigger signal in response to the storage of the selected group of partitionings of the macroblock and the corresponding motion search motion vectors and/or other results in the shared memory, and the motion refinement module 206 can commence the retrieval of the selected group of partitionings and the corresponding motion search motion vectors and/or other results from the shared memory in response to the trigger signal.

As discussed above, the motion refinement for a particular macroblock can be turned off by selectively disabling the motion refinement module for a particular application, compression standard, or macroblock. For instance, a skip mode can be determined where the cost associated with the stationary motion vector compares favorably to a skip mode cost threshold or if the total cost associated with a particular partitioning compares favorably to a skip refinement cost threshold. In this skip mode, the motion search motion vector can be used in place of the refined motion vector. In yet another optional feature, the motion search module 204 generates a motion search motion vector for a plurality of subblocks for a plurality of partitionings of a macroblock of a plurality of macroblocks based one of several costs calculations such as on a sum of accumulated differences (SAD) cost, as previously discussed. However, motion refinement module 206, when enabled, generates a refined motion vector for the plurality of subblocks for the plurality of partitionings of the macroblock of the plurality of macroblocks, based on the motion search motion vector for each of the plurality of subblocks of the macroblock of the plurality of macroblocks based on a sum of accumulated transform differences (SATD) cost. In this case, the mode decision module 212 must operate on either SAD costs from the motion search module 204 or SATD costs from the motion refinement module 206.

Mode decision module 212 is coupled to the motion refinement module 206 and the motion search module 204. When the motion refinement module 206 is enabled for a macroblock, the mode decision module 212 selects a selected partitioning of the plurality of partitionings, based on SATD costs associated with the refined motion vector for each of the plurality of subblocks of the plurality of partitionings of the macroblock. In addition, when the motion refinement module 206 is disabled for the macroblock, mode decision module 212 selects a selected partitioning of the plurality of partitionings, based on SAD costs associated with the motion search motion vector for each of the plurality of subblocks of the plurality of partitionings of the macroblock, and that determines a final cost for each of the plurality of subblocks corresponding to the selected partitioning of the macroblock.

Since the motion refinement engine 175 can operate in both a frame or field mode, mode decision module 212 selects one of a frame mode and a field mode for the macroblock, based on SATD costs associated with the refined motion vector for each of the plurality of subblocks of the plurality of partitionings of the macroblock of the plurality of macroblocks, or based on SAD costs associated with the motion search motion vector for each of the plurality of subblocks of the plurality of partitionings of the macroblock. The mode decision module 212 operates based on either SAD or SATD costs to determine a final macroblock cost. In a similar fashion, the IPCM module 218 compares a final macroblock cost (either SAD or SATD) to a programmable IPCM threshold that can be, for instance, a first value if SAD costs are compared to the threshold and a second value if SATD costs are compared to a threshold.

In an embodiment of the present invention, the motion refinement engine 175 is designed to work through a command FIFO located in the shared memory 205. The functional flexibilities of the engine are made possible with a highly flexible design of the command FIFO. The command FIFO has four 32-bit registers, of which one of them is the trigger for the motion refinement engine 175. It could be programmed so as to complete the motion refinement/compensation for a single partition, group of partitions or an entire MB/MB pair, with or without MBAFF, for forward, backward and blended directions with equal ease. It should be noted that several bits are reserved to support addition features of the present invention, such as one or more bits for a directional processing flag that indicates whether one pass or multi-pass mode is enabled, partitioning subsets used for each direction, direction subsets used for motion search and motion refinement, or for other functions and features not specifically addressed, such as future functions and features.

In a particular embodiment, the structure of the command FIFO is as summarized in the table below.

| Field Name | Bit Position | Description |
|---|---|---|
| TASK | 1:0 | 0 = Search/refine |
|  |  | 1 = Direct |
|  |  | 2 = Motion Compensation/Reconstruction |
|  |  | 3 = Decode |
| DIRECTION | 4:2 | Bit 0: FWD |

-continued

| Field Name | Bit Position | Description |
|---|---|---|
| | | Bit 1: BWD |
| | | Bit 2: Blended |
| WRITE_COST | 5 | 0 = Don't write out Cost |
| | | 1 = Write out Cost |
| PARTITIONS | 51:6 | Which partitions to turn on and off. This is interpreted in accordance with a MBAFF Flag |
| TAG | 58:52 | To tag the Index FIFO entry-7 bits |
| DONE | 59 | Generate Interrupt when finished this entry |
| PRED_DIFF_INDEX | 63:60 | Which Predicted and Difference Index to write to |
| CURR_Y_MB_INDEX | 67:64 | Which Current Y MB Index to read from |
| CURR_C_MB_INDEX | 71:68 | Which Current C MB Index to read from |
| FWD_INDEX | 75:72 | FWD Command Table Index to parse through |
| BWD_INDEX | 79:76 | BWD Command Table Index to parse through |
| BLEND_INDEX | 83:80 | BLEND Command Table Index to write to |
| Reserved | 84 | |
| THRESHOLD_ENABLE | 85 | Perform Refinement only for the partitions indicated by the threshold table. |
| BEST_MB_PARTITION | 86 | Use only the Best Macroblock partition. This will ignore the PARTITIONS field in this index FIFO entry |
| Reserved | 87 | |
| DIRECT_TOP_FRM_FLD_SEL | 89:88 | 00: None, 01: Frame, 10: Field, 11: Both |
| DIRECT_BOT_FRM_FLD_SEL | 91:90 | 00: None, 01: Frame, 10: Field, 11: Both |
| WRITE_PRED_PIXELS | 93:92 | 0 = Don't write out Predicted Pixels |
| | | 1 = Write out Top MB Predicted Pixels |
| | | 2 = Write out Bottom MB Predicted Pixels |
| | | 3 = Write out both Top and Bottom MB Predicted Pixels |
| | | (turned on for the last entry of motion compensation) |
| WRITE_DIFF_PIXELS | 95:94 | 0 = Don't Write out Difference Pixels |
| | | 1 = Write out Top MB Difference Pixels |
| | | 2 = Write out Bottom MB Difference Pixels |
| | | 3 = Write out both Top and Bottom MB Predicted Pixels |
| | | (Note: In Motion Compensation Mode, this will write out the Motion Compensation Pixels and will be turned on for the last entry of motion compensation) |
| CURR_MB_X | 102:96 | Current X coordinate of Macroblock |
| Reserved | 103 | |
| CURR_MB_Y | 110:104 | Current Y coordinate of Macroblock |
| Reserved | 111 | |
| LAMBDA | 118:112 | Portion of weighted for cost |
| Reserved | 121:119 | |
| BWD_REF_INDEX | 124:122 | Backward Reference Index |
| FWD_REF_INDEX | 127:125 | Forward Reference Index |

In addition to the Command FIFO, there are also some slice level registers in the shared memory that the motion refinement engine 175 uses. These include common video information like codec used, picture width, picture height, slice type, MBAFF Flag, SATD/SAD flag and the like. By appropriately programming the above bits, the following flexibilities/scenarios could be addressed:

1. The task bits define the operation to be performed by the motion refinement engine 175. By appropriately combining this with the codec information in the registers, the motion refinement engine 175 can perform any of the above tasks for all the codecs as listed earlier.
2. The direction bits refer to the reference picture that needs to be used and are particularly useful in coding B Slices. Any combination of these 3 bits could be set for any of the tasks. By enabling all these 3 bits for refinement, the motion refinement engine 175 can complete motion refinement for the entire MB in all three directions in one call. However, the motion refinement engine 175 can also could select any particular direction and perform refinement only for that (as might be required in P slices). The command FIFO, thus offers the flexibility to address both cases of a single, all-directions call or multiple one-direction calls.
3. The partitions bits are very flexible in their design as they holistically cater to motion refinement and reconstruction for all partitions and sub partitions. By effectively combining these bits with the direction bits, the motion refinement engine 175 can achieve both the extremes i.e. perform refinement for all partitions for all the directions in one shot or perform refinement/compensation for a select set of partitions in a particular direction. The partition bits are also dynamically interpreted differently by the motion refinement engine 175 engine based on the MBAFF ON flag in the registers. Thus, using an optimized, limited set of bits, the motion refinement engine 175 can address an exhaustive scenario of partition combinations. The structure of the partition bits for each of these modes is summarized in the tables that follow for frame (FRM), field (FLD) and direct mode (DIRECT) results.

MBAFF On:

| Macroblock | Partition | Frm/Fld | Bit |
|---|---|---|---|
| TOP MB | 16 × 16 | FRM | 0 |
| | | FLD | 1 |
| | | DIRECT | 2 |
| | 16 × 8 Top Partition | FRM | 3 |
| | | FLD | 4 |
| | 16 × 8 Bottom Partition | FRM | 5 |
| | | FLD | 6 |

-continued

| Macroblock | Partition | Frm/Fld | Bit |
|---|---|---|---|
| | 8 × 16 Left Partition | FRM | 7 |
| | | FLD | 8 |
| | 8 × 16 Right Partition | FRM | 9 |
| | | FLD | 10 |
| | 8 × 8 Top Left Partition | FRM | 11 |
| | | FLD | 12 |
| | | DIRECT | 13 |
| | 8 × 8 Top Right Partition | FRM | 14 |
| | | FLD | 15 |
| | | DIRECT | 16 |
| | 8 × 8 Bottom Left Partition | FRM | 17 |
| | | FLD | 18 |
| | | DIRECT | 19 |
| | 8 × 8 Bottom Right Partition | FRM | 20 |
| | | FLD | 21 |
| | | DIRECT | 22 |
| BOT MB | 16 × 16 | FRM | 23 |
| | | FLD | 24 |
| | | DIRECT | 25 |
| | 16 × 8 Top Partition | FRM | 26 |
| | | FLD | 27 |
| | 16 × 8 Bottom Partition | FRM | 28 |
| | | FLD | 29 |
| | 8 × 16 Left Partition | FRM | 30 |
| | | FLD | 31 |
| | 8 × 16 Right Partition | FRM | 32 |
| | | FLD | 33 |
| | 8 × 8 Top Left Partition | FRM | 34 |
| | | FLD | 35 |
| | | DIRECT | 36 |
| | 8 × 8 Top Right Partition | FRM | 37 |
| | | FLD | 38 |
| | | DIRECT | 39 |
| | 8 × 8 Bottom Left Partition | FRM | 40 |
| | | FLD | 41 |
| | | DIRECT | 42 |
| | 8 × 8 Bottom Right Partition | FRM | 43 |
| | | FLD | 44 |
| | | DIRECT | 45 |

MBAFF Off:

| | Partition | | Bit |
|---|---|---|---|
| FRAME | 16 × 16 | Enable | 0 |
| | | DIRECT | 1 |
| | 16 × 8 Top Partition | | 2 |
| | 16 × 8 Bottom Partition | | 3 |
| | 8 × 16 Left Partition | | 4 |
| | 8 × 16 Right Partition | | 5 |
| | 8 × 8 Top Left Partition | 8 × 8 | 6 |
| | | 8 × 4 | 7 |
| | | 4 × 8 | 8 |
| | | 4 × 4 | 9 |
| | | DIRECT | 10 |
| | 8 × 8 Top Right Partition | 8 × 8 | 11 |
| | | 8 × 4 | 12 |
| | | 4 × 8 | 13 |
| | | 4 × 4 | 14 |
| | | DIRECT | 15 |
| | 8 × 8 Bottom Left Partition | 8 × 8 | 16 |
| | | 8 × 4 | 17 |
| | | 4 × 8 | 18 |
| | | 4 × 4 | 19 |
| | | DIRECT | 20 |
| | 8 × 8 Bottom Right Partition | 8 × 8 | 21 |
| | | 8 × 4 | 22 |
| | | 4 × 8 | 23 |
| | | 4 × 4 | 24 |
| | | DIRECT | 25 |
| | | Reserved | 45:26 |

The command FIFO also has early termination strategies, which could be efficiently used to speed up the motion refinement intelligently. These could be used directly in conjunction with the motion search module 204 or with the intervention of the processor 200 to suit the algorithmic needs. These are as follows:

a. BEST MB PARTITION: This is the super fast mode, which chooses only the best mode as indicated by the motion search to perform refinement on. Motion refinement only looks at the particular partition that are in the in the threshold table that are set based on the motion search results for the BEST partition only one frame or field.

b. THRESHOLD ENABLE: This flag is used to enable the usage of the threshold information in a motion search MS Stats Register. If this bit is ON, the motion refinement engine 175 performs refinement ONLY for the modes specified in the threshold portion of the MS Stats Register. This bit works as follows. For each of the Top/Bottom, Frame/Field MBs, do the following:

If any of the partition bits (any of 16×16, 16×8, 8×16, 8×8) are enabled in the threshold portion of the MS Stats Register (this means that thresholds have been met for those partitions), do all those enabled partitions irrespective of the PARTITION bits in the Command FIFO. For the MBAFF OFF case, when the 8×8 bit is set, refinement is done ONLY for the best sub partition as specified in a hint table for each of the 8×8 partitions. Motion refinement only looks at particular partitions that are in the threshold table that are set based on the motion search results for those partitions that meet the threshold.

Figure 10:
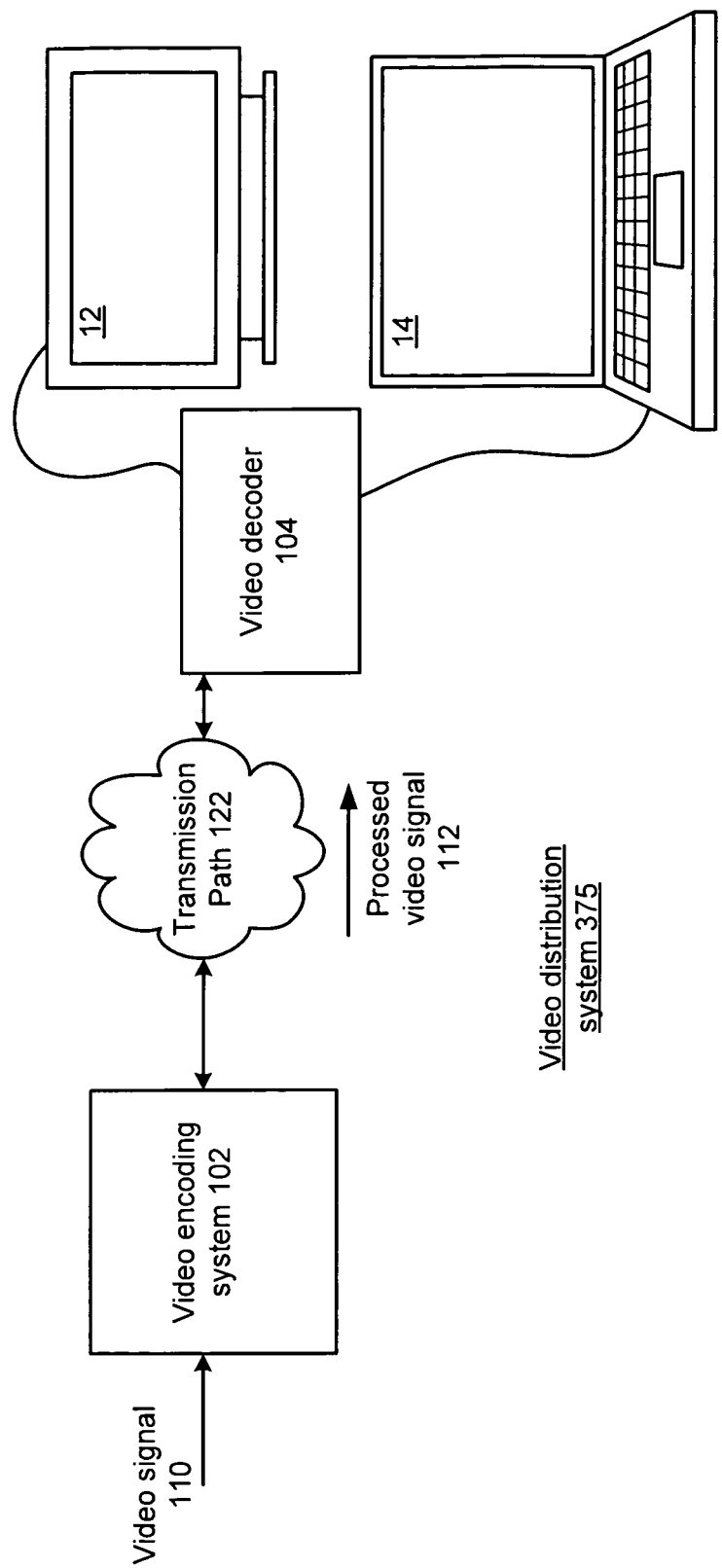
FIG. 10 presents a block diagram representation of a video distribution system 375 in accordance with an embodiment of the present invention.

FIG. 10 presents a block diagram representation of a video distribution system 375 in accordance with an embodiment of the present invention. In particular, processed video signal 112 is transmitted via a transmission path 122 to a video decoder 104. Video decoder 104, in turn can operate to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 11:
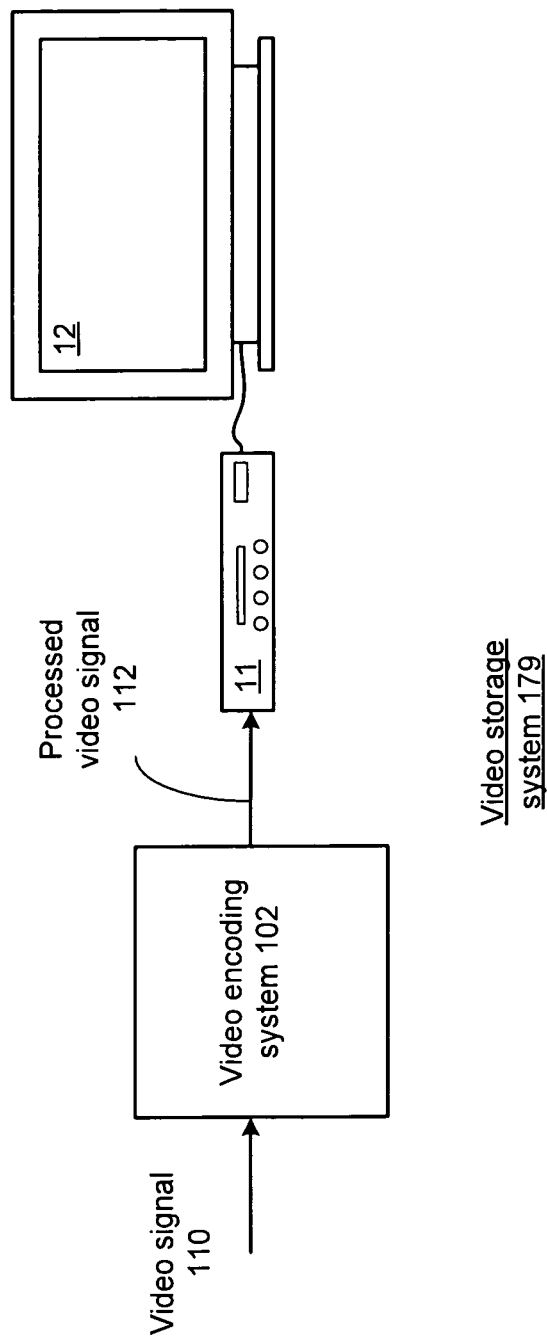
FIG. 11 presents a block diagram representation of a video storage system 179 in accordance with an embodiment of the present invention.

FIG. 11 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 12:
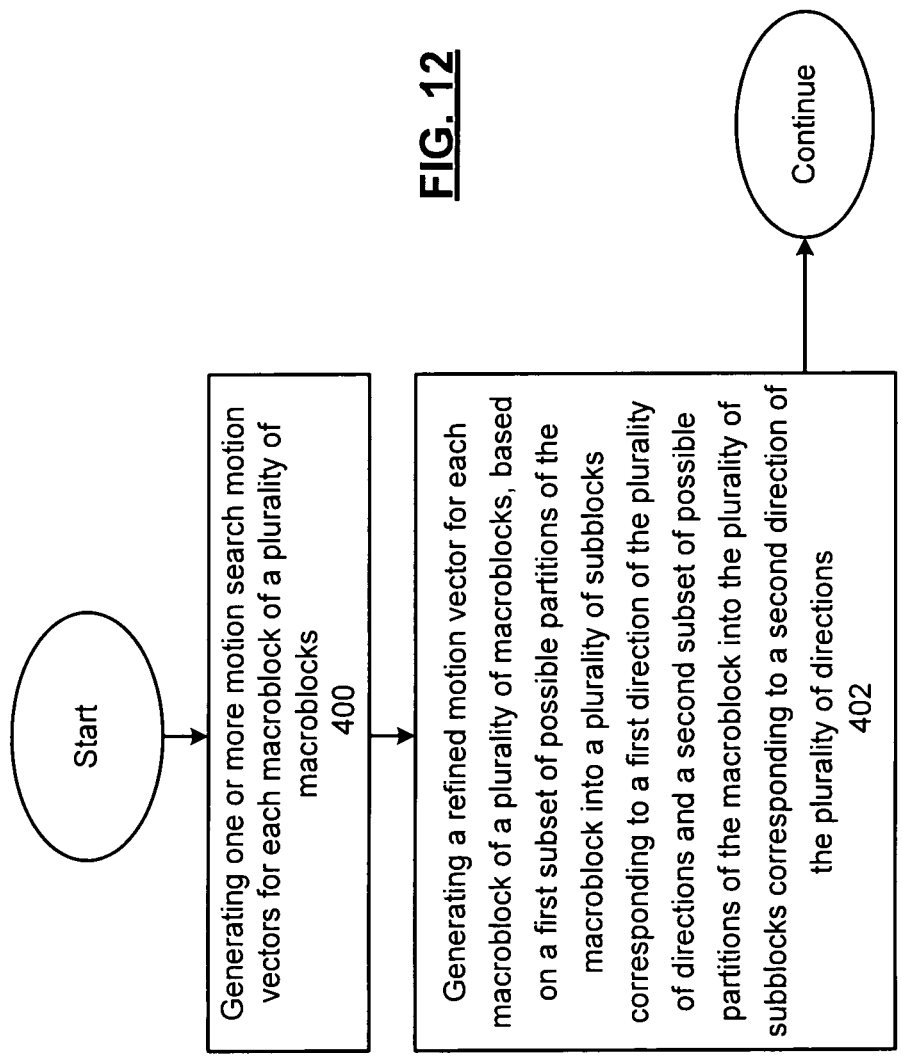
FIG. 12 presents a flowchart representation of a method in accordance with an embodiment of the present invention.

FIG. 12 presents a flowchart representation of a method in accordance with an embodiment of the present invention for use in conjunction with one or more of the features and functions described in association with FIGS. 1-11. In step 400, at least one motion search motion vector is generated for a macroblock of the plurality of macroblocks. In step 402, at least one refined motion vector is generated for the macroblock of the plurality of macroblocks, based on a first subset of possible partitions of the macroblock into a plurality of subblocks corresponding to a first direction of the plurality of directions and a second subset of possible partitions of the macroblock into the plurality of subblocks corresponding to a second direction of the plurality of directions.

In an embodiment of the present invention, step 400 is based on a first subset of the plurality of directions and step 402 is based on a second subset of the plurality of directions, wherein the second subset of the plurality of directions differ from the first subset of the plurality of directions. The first subset of the plurality of directions can include one, two or three directions, and the second subset of the plurality of directions can include one, two or three directions. The first subset of the plurality of directions can includes a forward direction, a backward direction, and/or a blended direction, and the second subset of the plurality of directions include the forward direction, the backward direction and/or the blended direction. Step 402 can generate a blended direction cost based on a stored forward cost and a stored backward cost.

Step 400 can generate the at least one motion search motion vector based on a first subset of possible partitions of the macroblock into a plurality of subblocks corresponding to a first direction of the plurality of directions and a second subset of possible partitions of the macroblock into the plurality of subblocks corresponding to a second direction of the plurality of directions. The first subset of possible partitions and the second subset of possible partitions can be selectable. The at least one refined motion vector can include a plurality of refined motion vectors, each of the plurality of refined motion vectors corresponding to one of a plurality of subblocks and having a corresponding one of the second plurality of directions.

In an embodiment of the present invention, steps 400 and/or 402 can operate in a macroblock adaptive frame and field mode and analyze each macroblock of a plurality of macroblocks based on macroblock pairs that include a top frame macroblock and bottom frame macroblock from a frame of the video input signal and a top field macroblock and a bottom field macroblock from a corresponding field of the video input signal.

In addition, the method can operate in a plurality of selected modes including a first mode corresponding to a first compression standard, a second mode corresponding to a second compression standard and a third mode corresponding to a third compression standard, such as an H.264 standard, a Motion Picture Experts Group (MPEG) standard, a Society of Motion Picture and Television Engineers (SMPTE) standard or other standard.

Figure 13:
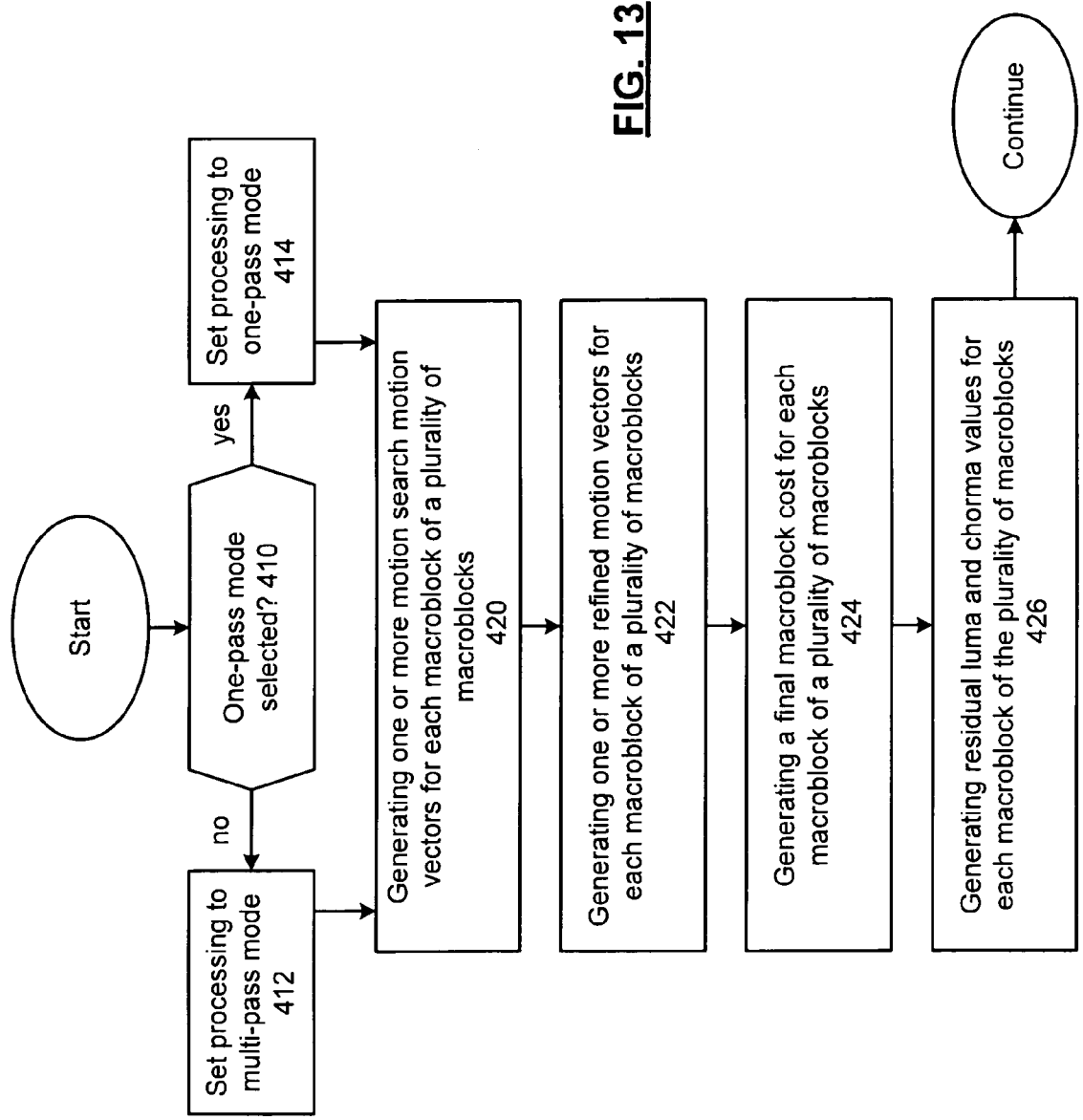
FIG. 13 presents a flowchart representation of a method in accordance with an embodiment of the present invention.

FIG. 13 presents a flowchart representation of a method in accordance with an embodiment of the present invention for use in conjunction with one or more of the features and functions described in association with FIGS. 1-12. In step 410 the method determines if whether a one-pass mode is selected. If so, processing is set to one-pass mode as shown in step 414 where processing for all directions are processed in a single pass. If not, processing is set to multi-pass mode as shown in step 412 where each direction is processed in a separate pass. In step 420, at least one motion search motion vector is generated for a macroblock of the plurality of macroblocks. In step 422, at least one refined motion vector is generated for the macroblock of the plurality of macroblocks. In step 424, a final macroblock cost is generated for the macroblock of the plurality of macroblocks. In step 426, residual luma and chroma values are generated for the macroblock of the plurality of macroblocks, wherein, in the one-pass mode of operation, the at least one motion search motion vector, the at least one refined motion vector, the final macroblock cost and the residual chroma and luma values are generated in one pass for a plurality of directions, otherwise multiple passes are employed. For instance, in a multi-pass mode of operation, the at least one refined motion vector is generated in one pass for a first direction of the plurality of directions and is generated in a second pass for a second direction of the plurality of directions.

In an embodiment of the present invention, steps 420, 422, 424 and/or 426 operate in a macroblock adaptive frame and field mode and analyze each macroblock of a plurality of macroblocks based on macroblock pairs that include a top frame macroblock and bottom frame macroblock from a frame of the video input signal and a top field macroblock and a bottom field macroblock from a corresponding field of the video input signal.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and motion compensation module and motion refinement engine for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A motion refinement engine for use in a video encoder for encoding a video input signal that includes a sequence of images that are segmented into a plurality of macroblocks, the motion refinement engine comprising:
   a motion search module, that generates at least one motion search motion vector for a macroblock of the plurality of macroblocks; and
   a motion refinement module, coupled to the motion search module, that generates at least one refined motion vector for the macroblock of the plurality of macroblocks, based on a first subset of possible partitions of the macroblock into a plurality of subblocks corresponding to a first direction of a plurality of directions and a second subset of possible partitions of the macroblock into the plurality of subblocks corresponding to a second direction of the plurality of directions.

2. The motion refinement engine of claim 1 wherein the motion search module generates the at least one motion search motion vector for the macroblock of the plurality of macroblocks based on a first subset of the plurality of directions, and wherein the motion refinement module, coupled to the motion search module generates the at least one refined motion vector for the macroblock of the plurality of macroblocks based on a second subset of the plurality of directions, wherein the second subset of the plurality of directions differs from the first subset of the plurality of directions.

3. The motion refinement engine of claim 2 wherein the first subset of the plurality of directions includes two directions, and the second subset of the plurality of directions includes three directions.

4. The motion refinement engine of claim 2 wherein the first subset of the plurality of directions includes a forward direction, a backward direction, and the second subset of the plurality of directions include the forward direction, the backward direction and a blended direction.

5. The motion refinement engine of claim 4 wherein the motion refinement module generates a blended direction cost based on a stored forward cost and a stored backward cost.

6. The motion refinement engine of claim 1 wherein the motion search module generates the at least one motion search motion vector based on a first subset of possible partitions of the macroblock into a plurality of subblocks corresponding to a first direction of the plurality of directions and a second subset of possible partitions of the macroblock into the plurality of subblocks corresponding to a second direction of the plurality of directions.

7. The motion refinement engine of claim 1 wherein the first subset of possible partitions and the second subset of possible partitions are selectable.

8. The motion refinement engine of claim 1 wherein the at least one refined motion vector includes a plurality of refined motion vectors, each of the plurality of refined motion vectors corresponding to one of a plurality of subblocks and having a corresponding one of the plurality of directions.

9. A method for use in a video encoder for encoding a video input signal that includes a sequence of images that are segmented into a plurality of macroblocks, the method comprising:
   generating at least one motion search motion vector for a macroblock of the plurality of macroblocks; and
   generating at least one refined motion vector for the macroblock of the plurality of macroblocks, based on a first subset of possible partitions of the macroblock into a plurality of subblocks corresponding to a first direction of a plurality of directions and a second subset of possible partitions of the macroblock into the plurality of subblocks corresponding to a second direction of the plurality of directions.

10. The method of claim 9 wherein generating the at least one motion search motion vector for a macroblock of the plurality of macroblocks is based on a first subset of the plurality of directions and generating the at least one refined motion vector for the macroblock of the plurality of macroblocks is based on a second subset of the plurality of directions, wherein the second subset of the plurality of directions differ from the first subset of the plurality of directions.

11. The method of claim 10 wherein the first subset of the plurality of directions includes two directions, and the second subset of the plurality of directions includes three directions.

12. The method of claim 10 wherein the first subset of the plurality of directions includes a forward direction, a backward direction, and the second subset of the plurality of directions include the forward direction, the backward direction and a blended direction.

13. The method of claim 12 wherein generating the at least one refined motion vector generates a blended direction cost based on a stored forward cost and a stored backward cost.

14. The method of claim 9 wherein the step of generating at least one motion search motion vector generates the at least one motion search motion vector based on a first subset of possible partitions of the macroblock into a plurality of subblocks corresponding to a first direction of the plurality of directions and a second subset of possible partitions of the macroblock into the plurality of subblocks corresponding to a second direction of the plurality of directions.

15. The method of claim 9 wherein the first subset of possible partitions and the second subset of possible partitions are selectable.

16. The method of claim 9 wherein the at least one refined motion vector includes a plurality of refined motion vectors, each of the plurality of refined motion vectors corresponding to one of a plurality of subblocks and having a corresponding one of the second plurality of directions.

17. A motion refinement engine for use in a video encoder for encoding a video input signal that includes a sequence of images that are segmented into a plurality of macroblocks, the motion refinement engine comprising:
   a motion search module, that generates at least one motion search motion vector for a macroblock of the plurality of macroblocks;
   a motion refinement module, coupled to the motion search module, that generates at least one refined motion vector for the macroblock of the plurality of macroblocks;
   a motion mode decision module, coupled to the motion refinement module, that generates a final macroblock cost for the macroblock of the plurality of macroblocks; and
   a reconstruction module, coupled to the mode decision module, that generates residual luma and chroma values for the macroblock of the plurality of macroblocks;
   wherein, in a first mode of operation, the at least one motion search motion vector, the at least one refined motion vector, the final macroblock cost and the residual chroma and luma values are generated in one pass for a plurality of directions; and
   wherein, in a second mode of operation, the motion refinement module generates the at least one refined motion vector in one pass for a first direction of the plurality of directions and a second pass for a second direction of the plurality of directions.

18. A method for use in a video encoder for encoding a video input signal that includes a sequence of images that are segmented into a plurality of macroblocks, the method comprising:
- generating at least one motion search motion vector for a macroblock of the plurality of macroblocks;
- generating at least one refined motion vector for the macroblock of the plurality of macroblocks;
- generating a final macroblock cost for the macroblock of the plurality of macroblocks; and
- generating residual luma and chroma values for the macroblock of the plurality of macroblocks;
- wherein, in a first mode of operation, the at least one motion search motion vector, the at least one refined motion vector, the final macroblock cost and the residual chroma and luma values are generated in one pass for a plurality of directions; and
- wherein, in a second mode of operation, the at least one refined motion vector is generated in one pass for a first direction of the plurality of directions and is generated in a second pass for a second direction of the plurality of directions.

* * * * *